United States Patent [19]

Coulboy et al.

[11] 3,961,815

[45] June 8, 1976

[54] LEAK-TIGHT BALL-AND-SOCKET CONNECTING DEVICE TRANSMITTING TORQUES AND STRESSES BETWEEN TWO PIPES

[75] Inventors: René H. Coulboy, Sausset les Pins, France; Donald F. Taylor, Dallas, Tex.

[73] Assignee: Subsea Equipment Associates Limited, Hamilton, Bermuda

[22] Filed: May 6, 1975

[21] Appl. No.: 575,119

[30] Foreign Application Priority Data

May 6, 1974 France ............................. 74.15527

[52] U.S. Cl. ................................. 285/93; 285/95; 285/267; 285/DIG. 1
[51] Int. Cl.² ........................................ F16L 27/06
[58] Field of Search .............. 285/261, DIG. 1, 267, 285/264, 265, 262, 95, 114, 93

[56] References Cited

UNITED STATES PATENTS

| | | | |
|---|---|---|---|
| 1,681,626 | 8/1928 | Russell | 285/267 X |
| 3,182,452 | 5/1965 | Eldred | 285/261 X |
| 3,477,748 | 11/1969 | Tinsley | 285/267 |
| 3,523,578 | 8/1970 | Nolan, Jr. et al. | 285/265 X |
| 3,874,706 | 4/1975 | Arnold | 285/261 X |
| 3,889,985 | 6/1975 | Gartmann | 285/261 X |

FOREIGN PATENTS OR APPLICATIONS 1,189,052   4/1970   United Kingdom................ 285/261

Primary Examiner—Thomas F. Callaghan
Attorney, Agent, or Firm—Sughrue, Rothwell, Mion, Zinn & Macpeak

[57] ABSTRACT

A leak-tight connecting device for the connection of two pipes comprising a primary ball-and-socket joint traversed by a bore, a secondary connecting support for said ball-and-socket joint, said secondary support comprising first and second outer sealing joints and a common central sealing joint located between said first and second outer sealing joints, each said sealing joint being disposed between said ball and socket joint and said support to define with said support and said ball-and-socket joint two chambers, means for connecting said chambers to a source of an incompressible fluid under pressure, mechanical means externally connecting said ball-and-socket joint and said secondary support, said mechanical means being pivotally coupled to each said joint and said support and operable to transmit torque from one of said joint and support to the other for various relative angular dispositions of said joint and said support and means for biasing at least one of said outer sealing joints bounding said chambers against said ball-and-socket joint.

20 Claims, 6 Drawing Figures

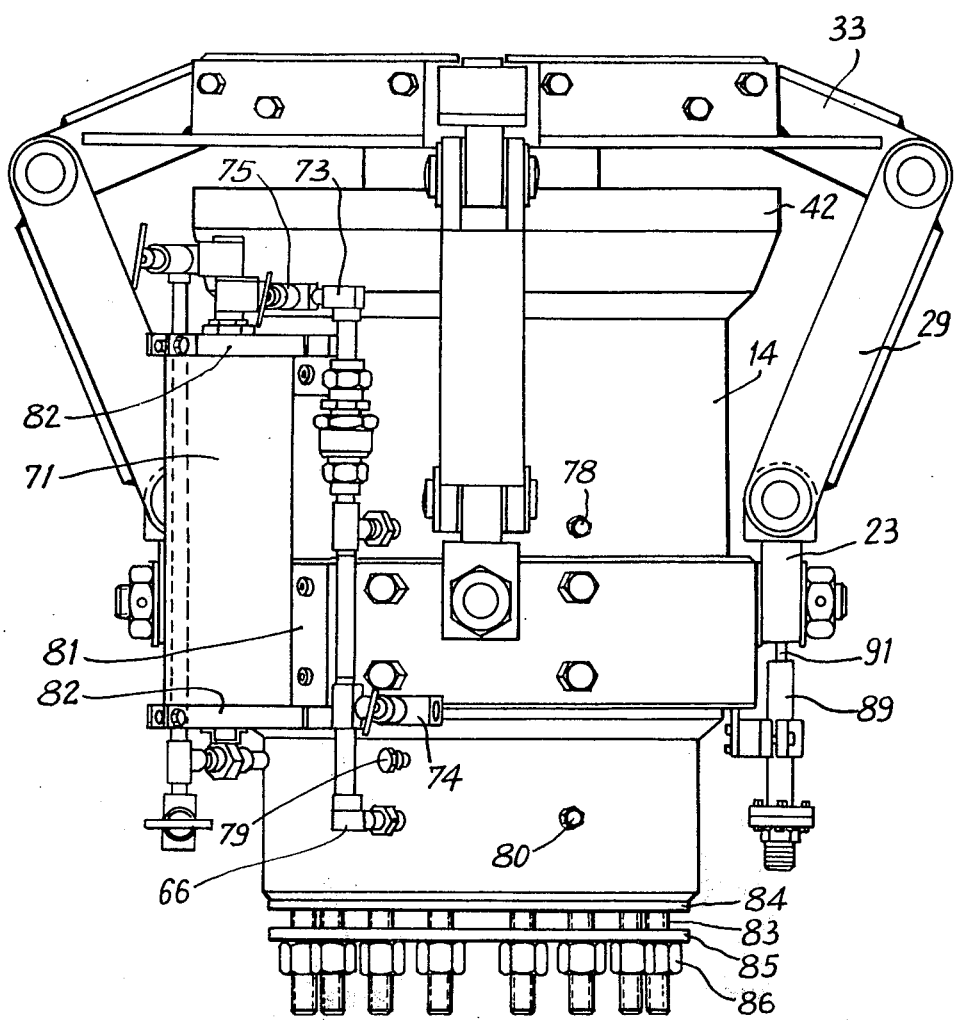

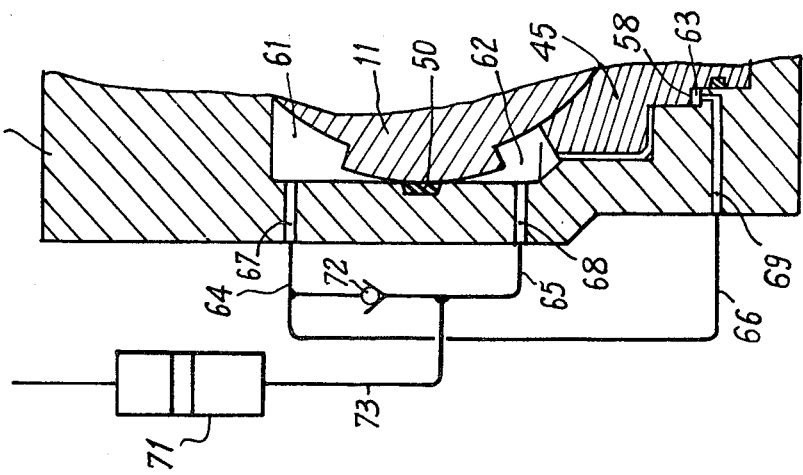
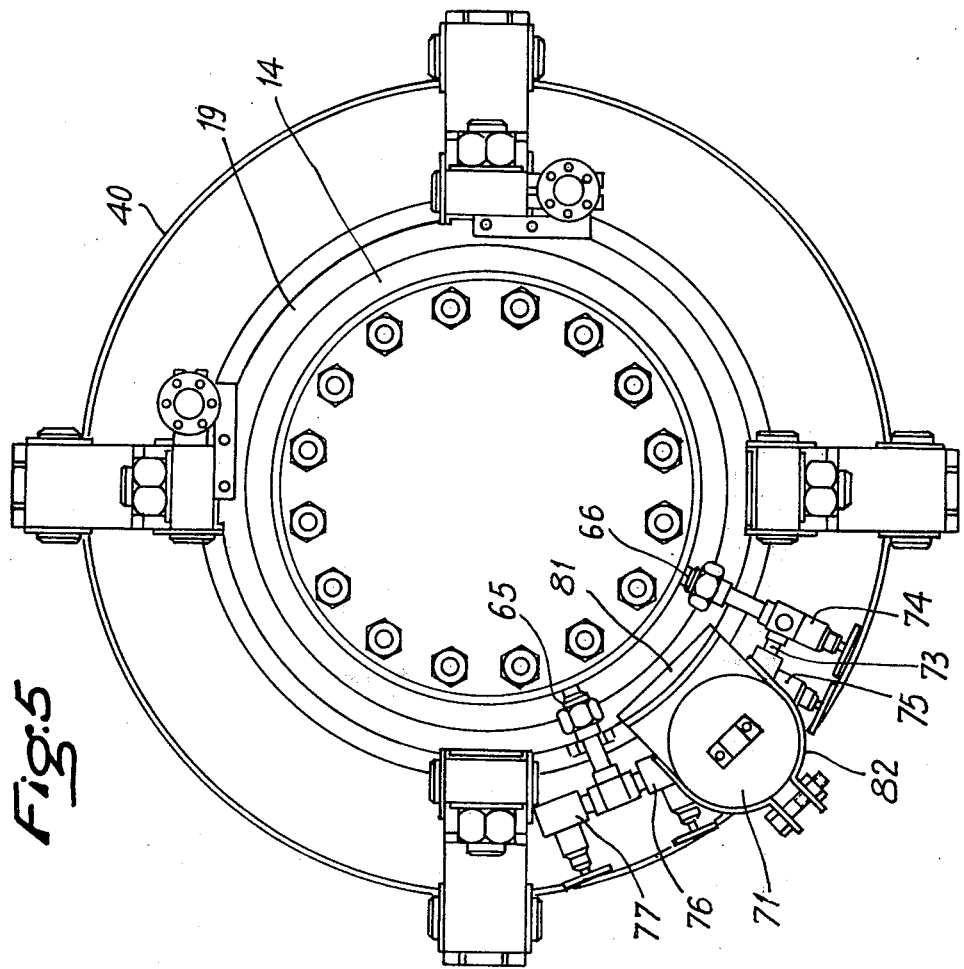

LEAK-TIGHT BALL-AND-SOCKET CONNECTING DEVICE TRANSMITTING TORQUES AND STRESSES BETWEEN TWO PIPES

The invention relates to a ball and socket connecting device ensuring on the one hand a leak-tight connection between two pipes liable to assume a certain difference in orientation one in relation to the other, and on the other hand the transmission of stresses and torques applied to these pipes. It is applicable in particular to the overhead connection of any equipment to a deep-sea pipe head, the equipment then being lowered by means of a riser provided with such a device.

Ball and socket connecting devices ensuring a leak-tight connection of two pipes of variable orientation capable of resisting high pressures are known. One of the methods used is that described in the patent of N. F. Brown published in the United States under U.S. Pat. No. 3,236,544. The purpose of such a connection is to reduce the stresses applied between the components forming the joint by the presence of two adjacent chambers filled with an incompressible liquid, these chambers being bounded by sealing joints between the ball-and-socket joint and its case, the area of the contact faces of the joints with the ball-and-socket joint being small, and the liquid serving to support the ball-and-socket joint.

A method is also known for reducing the pressure exerted on sealing joints in the case of a throttle valve mounted on a ball bearing as described in the patent of N. F. Brown published in the United States under U.S. Pat. No. 3,384,337.

However, there is at present no known ball-and-socket connecting device ensuring both a leak-tight connection between two pipes and the transmission of torques and loads sustained by one of these pipes.

Thus one of the aims of the present invention is to provide a connecting device of the type indicated above comprising at least two chambers containing a liquid under pressure, these chambers being bounded by sealing joints. The device ensures a leak-tight connection between two pipes capable of assuming a difference in orientation one in relation to the other, this device being able to transmit the torques and loads applied on one of the pipes to the other.

For this purpose the device is designed to transmit axial torques by a primary coupling mechanism, the tensile and compressive stresses being transmitted by internal means exerting compressive stresses on the ball-and-socket joint.

Another aim of the present invention is to provide a connecting device of the type indicated which is also capable of resisting the stresses it receives after its component parts have reached their maximum displacement without any risk of permanent deformations or ruptures, the breaking strength of these parts being greater than the resistance or strength of the pipes to which the device is connected.

A characteristic of the invention therefore lies in a new arrangement of the said mechanical coupling devices enabling components to resist possible overloads.

Another aim of the invention is to provide a device of this type capable of resisting very high internal or external pressures and of preventing all penetration of liquids in its pipework whilst again subject to considerable tensile and compressive loads, this characteristic being obtained by counterbalancing the pressures of several pressure chambers.

Another aim of the invention is to provide a device of this type capable of producing and transmitting the angular difference between the axes of the pipes connected to the device and of determining the position of one of them inclined to the meridian and to the horizontal in relation to the other, whatever the depth to which the device is lowered.

In order that the invention may be well understood, there will now be described an embodiment thereof, given by way of example only, reference being made to the accompanying drawings in which:

FIG. 3 is a front elevation;

FIG. 5 is a plan view, and

FIG. 6 is a diagram showing the hydraulic circuit serving the pressure chambers.

Figure 1:
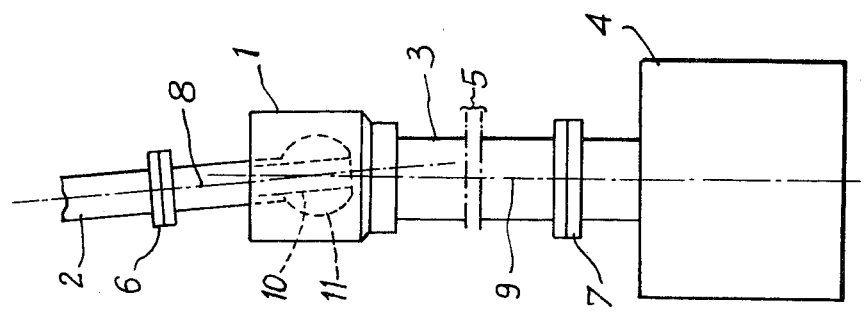
FIG. 1 is a schematic representation, in vertical section, of a lowering system in submarine well equipment provided with the device according to the invention.

In FIG. 1, a ball-and-socket device indicated at 1 connects an end of a riser 2 to a tubular supporting element 3 on which is suspended a unit 4 for mounting on a submarine well head. Tubular element 3 may in fact comprise several parts such as guiding and handling means for installing unit 4. These parts, which are well known, are not shown but may be regarded as located in the omitted region 5. Connecting means 6 and 7 may include all the required safety devices. Ball-and-socket connecting device 1 permits a variable angular relationship between axis 8 of riser 2 and axis 9 of supporting element 3, bore 10, FIG. 2, of ball-and-socket joint 11 being coaxial with riser 2.

Figure 2:
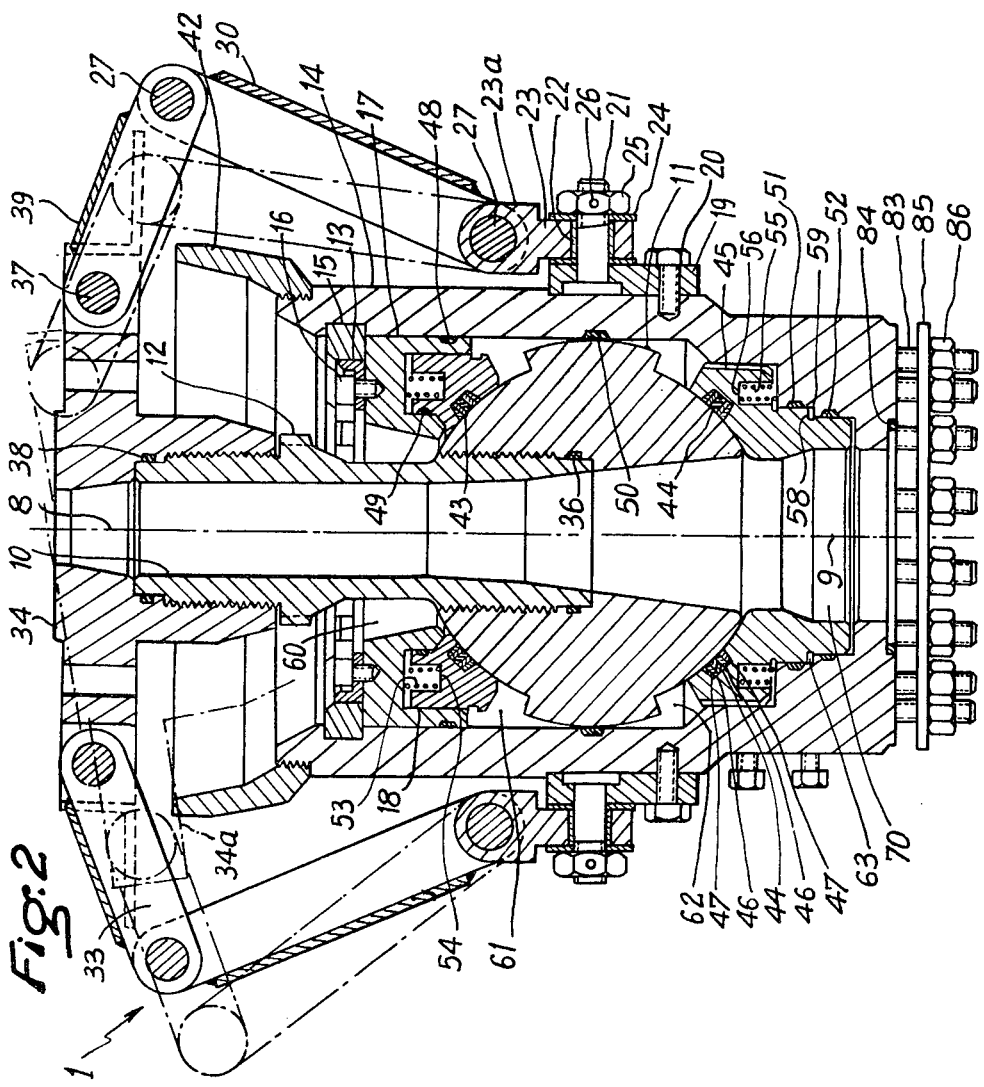
FIG. 2 is an axial section of the device.

The section of FIG. 2 shows the device in full lines for axes 8 and 9 coincident and in broken lines the external contour of the connection of ball-and-socket joint 11 when axis 8 is at a predetermined limit inclination in relation to axis 9. Ball-and-socket joint 11 is carried by a support 14 to which the supporting element 3 is connected. The upper half of support 14 comprises a retainer ring 15 and a locking ring 13 which retains seat support 17 of the upper seating 18 of ball-and-socket joint 11 by means of screws 16.

Support 14, on its exterior wall, has a ring 19 secured by bolts 20 and by welding. This ring is used to secure four spindles 21 carrying rotary bearings 22 of lower arms 23, FIG. 4. Washers 24 and nuts 25 cottered at 26, ensure lateral retention of these arms. End 23a of each arm 23 pivots around a shaft 27 supporting eyes 28 of transmission rods 29 strengthened by reinforcement plates 30. Thrust-collars 31 and locking washers 32 ensure retention of shafts 27. A similar assembly provides connection of the upper ends of rods 29 to the ends of upper arms 33 articulated on shafts 37, FIG. 2, to connecting flange 34, the latter being mounted by means of a thread on connection 12 of ball-and-socket joint 11. Sealing joints 36 and 38 ensure the leak-tightness of connection 12 on ball-and-socket joint 11 and on flange 34 respectively. Reinforcement plates 39, FIG. 4, serving the same purpose as plates 30, help to strengthen upper arm 37. Thus the assembly formed by flange 34 and the four hinged connections comprising rods 29 which link lower arms 23 to upper arms 33, these arms being articulated on shafts 21 solid with ball-and-socket joint support 14 and shafts 37 solid with flange 34 respectively, enables any torque exerted on riser 2 or on support pipe 3 to be transmitted to the other pipe, whatever the orientations of each of axes 8 and 9. Deflectors 40 serve to protect the upper half of the device located between the central part of flange 34 and stop 42, which forms a cup, against the accidental falling of foreign bodies.

Stop 42 is screwed to the upper end of support 14 and limits the angular difference between axes 8 and 9. Thus in the event of the difference attaining the permissible limit due to conditions it is found necessary to impose on the system the lower half 34a of flange 34 abuts against rim 42, as shown by the dotted line.

Joints 43 and 44 ensure leak-tightness between the ball of ball-and-socket joint 11 and the corresponding seats 18 and 45 of the joint, and do not themselves form part of the invention. Consequently they may be joints already known, and described, for example, in one of the patents quoted. Each joint may be edged by reinforcement rings 46 which are in turn retained by protective rings 47. It is obvious that the joints denoted by references 48, 49, 50, 51 and 52 may be of the same type, the schematic representation being given only to facilitate reading of the drawing. Joint 48 ensures leak-tightness between seat support 17 of the upper seating of the ball-and-socket joint and support 14, joint 49 ensuring leak-tightness between seat support 17 and the upper seating 18, and prevents any infiltration of the outside atmosphere 60 into chamber 61 bounded by the walls of ball-and-socket joint 11, support 14, seat support 17 and the upper seating 18, as well as by joints 48 and 50. Springs 53 mounted in housings 54 of the upper seating 18 and resting on seat support 17 push joint 43 against ball-and-socket joint 11.

Similarly, springs 55 mounted in housings 56 of the lower seating 45 and resting directly on a shoulder 57 of support 14 push joint 44 against the ball-and-socket joint.

Joints 44, 50 and 51 ensure leak-tightness of chamber 62 bounded by ball-and-socket joint 11, lower seat 45 and support 14, joints 44 and 52 preventing any penetration of the internal atmosphere 70.

Joints 51 and 52 seal auxiliary pressure chamber 63 formed by shoulders 58 and 59 belonging to seat 45 and support 14 respectively.

Chambers 61, 62 and 63 are connected to pipes 64, 65 and 66 respectively, FIG. 6, of a hydraulic circuit fed by reservoir 71 through three pipes 67, 68 and 69 traversing support 14. A one way valve 72 preventing any return of the hydraulic fluid from chambers 61 and 63 to reservoir 71 is installed between feed pipe 73 and the junction of pipes 64 and 66. Because of this, and whatever the compressive and tensile conditions exerted on the ball-and-socket joint seats and on the joint itself, the pressures prevailing in chambers 61 and 63 are equal. Since the hydraulic feed circuits are known, it is not necessary to describe in detail circuits which may comprise control valves such as those shown at 74, 75, 76 and 77, FIG. 3. The feed is effected so that the hydraulic fluid does not contain any gas and it is obvious that the various pipes may contain any filtering device required. Similarly, blow-off cocks 78, 79 and 80 may serve chambers 61, 62 and 63. In the example shown, reservoir 71 is made solid with joint support 14 by means of supports 81–82. As regards connecting support 14 to support pipe 3, this may be done with a flange using threaded rods 83 which together with sealing joint 84, ring 85 and nuts 86 are used to lock all connecting flanges tight.

Figure 4:
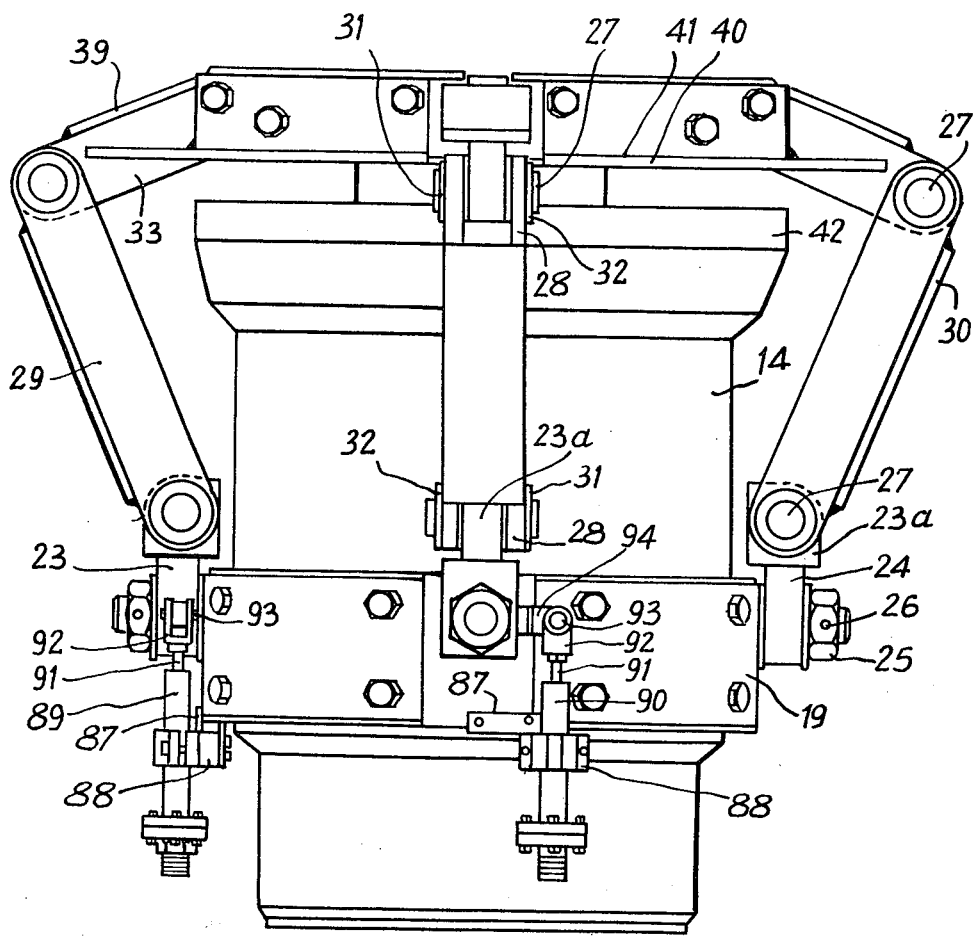
FIG. 4 is a rear elevation.

Support 14 comprises two more pairs of supports 87 and 88, FIG. 4, which are used to retain two cylinders 89 and 90, inside each of which slides a piston. Each piston is driven by a rod 91 connected by a stirrup 92 and a shaft 93 to an arm 94 articulated at one of its ends on shaft 93. The other end of arm 94 is fixed to one of lower arms 24. Arms 94, solid with lower arms 23, thus control rods 91 of cylinders 89 and 90 arranged at 90° to each other on ring 19. Under these conditions, it can be seen that when axis 8 moves from the position shown in any direction, arms 94 corresponding to cylinders 89 and 90, each assume a certain inclination depending on the new position of axis 8, so that it is sufficient to transmit, by any known transmission method, a value which is a function of the displacement of each rod 91 in order to know the angular difference of axes 8 and 9 as well as the parameters; inclination to meridian and horizontal, for example, determining the new orientation of shaft A in relation to support 14. Of the methods of converting the displacements of rods 91 to numerical values an intermediate conversion device may be used by variation of the induction caused by the new position of rods 91. Any other intermediate method of conversion may be provided, such as variation in gas pressure, mechanical amplification and theostat or any other known device.

Although a preferred embodiment of the invention applied to the installation of submarine equipment by means of a riser has been described, it is evident that the use of such a connecting device under less severe conditions would not represent a departure from the spirit of the invention.

Thus when the maximum angular differences likely to be assumed by axes 8 and 9 are known, for example, it is not necessary to provide a stop rim such as 42. Similarly, if it is known that ball-and-socket joint 11 will always be made to rest on its lower seat 45 because of its conditions of use, it is not essential to provide springs 55, and conversely, if the device always operates under traction, the upper seating 18 may not be acted on by springs 53, provided, however, that device 1 is not subject to shocks. Moreover, as an alternative, ball-and-socket joint 11 may be designed in two sections and the two series of springs 53 and 55 may be replaced by a single series of springs installed in housings facing the two halves of the ball-and-socket joint, these springs tending to press each half of the joint on to its seat. Nor would the provision of symmetrical seats and chambers for random use of one or other end of support 14 of the device in any lower or upper position constitute a departure from the spirit of the invention, the hydraulic fluid feed circuits possibly being designed to generate variable pressures in the chambers, depending on their geometry or, if the pressure generated by the hydraulic circuit is the same, the geometries of the chambers may be changed at random by assembly by a single thread pitch, for example. The geometry of the chambers and the pressures may also be varied simultaneously, the pressures being increased by conventional pressure multipliers.

In the preferred embodiment of the invention a joint whose mean diameter is slightly smaller than the mean diameter of joint 48 is chosen as joint 49, and a pressure greater than the pressure of the outside atmosphere 60 is applied to chamber 61. Under these conditions all infiltration of the outside atmosphere is prevented, the force exerted on seat 18 always being sufficient to push joint 43 against ball-and-socket joint 11.

If the load constituted, for example, by equipment 4 is considerable, the pressure in chamber 61 increases without the fluid contained in it returning to reservoir 71, FIG. 6, since valve 72 prevents any such return. Despite the tendency of the pressure in chamber 62 to decrease because of the tension exerted upwards on ball-and-socket joint 11, the pressure is constantly being re-established by circuit 65 communicating with pressure reservoir 71 via 73. Under these conditions this pressure enables a sufficient thrust to be exerted on lower seat 45 to keep joint 44 pressed against ball-and-socket joint 11.

Moreover the presence of pipe 66 enables a pressure identical to the pressure in chamber 61 to be applied in chamber 63 so that any tendency of the pressure in chamber 62 to decrease produces a tendency for seat 45 to push back joint 44 against the ball-and-socket joint.

If the pressure prevalent in interior space 70 is sufficient to push ball-and-socket joint 11 upwards, it will be observed that the pressure in chamber 61 tends to increase and that consequently the pressure in chamber 63 will also increase because of pipe 66. The reduction in the volume of chamber 61 therefore causes the volume of chamber 63 to increase, and consequently seat 45, which continues to press joint 44 on to the ball-and-socket joint, is raised.

Conversely, if the external atmospheric pressure 60 is sufficient to bring about the displacement of ball-and-socket joint 11 towards its seat 45, the volume of chamber 61 tends to increase, causing the volume of chamber 63 to decrease because of pipe 66, until, with the upper and lower seats displaced downwards, a balance is again reached due to the compression of springs 55.

It will be observed that in choosing the pressure supplied by source 71 to ensure that the pressure in chamber 62 is always greater than the external pressure in space 60, the downwards movement of the ball-and-socket joint is more accentuated, but the assembly of upper seat 18, ball-and-socket joint 11, and lower seat 45, behaves practically as a single assembly so that the loads are transmitted, from riser 2 to element 3 across device 1 in the example shown in FIG. 1.

As regards the effects of shocks liable to be produced as a result of equipment 4 meeting an unforeseen obstacle, these will accelerate the descent of the seat and joint assembly so that springs 55 are chosen in such a number that they are able to absorb these shocks and therefore prevent too long a travel of the lower seat.

What is claimed is:
1. Leak-tight connecting device for the connection of two pipes comprising: a primary ball-and-socket joint traversed by a bore; a secondary connecting support for said ball-and-socket joint, said secondary support comprising first and second outer sealing joints and a common central sealing joint located between said first and second outer sealing joints, each said sealing joint being disposed between said ball and socket joint and said support to define with said support and said ball-and-socket joint two chambers; means for connecting said chambers to a source of an incompressible fluid under pressure; mechanical means externally connecting said ball-and-socket joint and said secondary support, said mechanical means being pivotally coupled to each said joint and said support and operable to transmit torque from one of said joint and support to the other for various relative angular dispositions of said joint and said support; and means for biasing at least one of said outer sealing joints bounding said chambers against said ball-and-socket joint.

2. A device according to claim 1, in which the said mechanical connecting means comprises at least one arm pivotal on a shaft carried by one of said ball-and-socket joints and said support and an arm pivoting on a shaft carried by other of said ball-and-socket joint and said support, said shafts having their axes in planes perpendicular to each other and to the axis of said device.

3. A device according to claim 2, in which the axis of said shaft, carried by said connecting support and around which one of said arms pivots, passes through the centre of said ball-and-socket joint.

4. A device according to claim 1, in which said mechanical connecting means comprises two link means spaced at an angle of 90° about the axis of said device, each link means comprising at least two pivotally connected arms, each arm being pivotal about the axis of a shaft carried by one of said ball-and-socket joint and said support, the axis of said shaft carried by said ball-and-socket joint being in a plane perpendicular to the plane of the axis of said shaft carried by said support.

5. A device according to claim 4, in which each of said arms on said ball-and-socket joint comprises an auxiliary arm coupled to a device for measuring the displacement of that arm, means being provided to transmit the measurement for establishing the angular difference of said ball-and-socket joint and said support.

6. A device according to claim 2, in which said mechanical means of connection are symmetrical about the axis of the device, said arms carried by said ball-and-socket joint being coupled to a connection flange.

7. A device according to claim 1, in which said support comprises a rim and means on said ball-and-socket joint abut said rim upon predetermined inclination of said joint relative to said support.

8. A device according to claim 1, in which one of said two pressure chambers is isolated from the external atmosphere by an outer joint which is supported by a seat of said ball-and-socket joint, by an internal sealing joint located between said seat and a seat support, and by an external joint located between said seat support and said support.

9. A device according to claim 8, in which said seat support comprises a housing in the form of a cylindrical rim to allow said seat to be displaced in a direction parallel to the axis of said support.

10. A device according to claim 8, in which the median diameter of said sealing joint urged by said seat on to said ball-and-socket joint is slightly greater than the outside diameter of said internal joint located between said seat and said seat support.

11. A device according to claim 8, in which said seat is biased by compression springs bearing on said seat support towards said ball-and-socket joint.

12. A device according to claim 8, in which one of said pressure chambers is isolated from the bore of said ball-and-socket joint by a sealing joint supported by a seat of said ball-and-socket joint and by at least one sealing joint between said seat and said support.

13. A device according to claim 12, in which said seat delimits a third pressure chamber located between said sealing joint, ensuring separation from said bore atmosphere, and a second joint located between said support and said seat.

14. A device according to claim 12, in which the internal wall of said support and the external wall of said seat are each formed by at least two cylindrical sections, said seat being axially displaceable relative to said support.

15. A device according to claim 12, in which the diameter of the larger joint delimiting the third chamber is slightly larger than that of the joint between the said seat and said ball-and-socket joint.

16. A device according to claim 12, in which said seat is urged by springs toward said ball-and-socket joint.

17. A device according to claim 12, in which said central pressure chamber is maintained at a pressure greater than the pressure of the outside atmosphere.

18. A device according to claim 17, in which said extreme chambers are in permanent communication.

19. A device according to claim 18, in which said extreme chambers are connected to a common circuit comprising a nonreturn valve, means being provided to connect that valve and the central chamber to a hydraulic fluid source kept at constant pressure.

20. A device according to any one of claim 1 in which said ball-and-socket joint is formed by two parts capable of being displaced one in relation to the other under the influence of springs pushing the said parts against said outer joints delimiting said pressure chambers in part formed by the surface of said ball-and-socket joint.

* * * * *